July 25, 1933.   H. C. BULLARD   1,919,683

VEHICLE WHEEL

Filed Jan. 4, 1930

Inventor
Henry C. Bullard

By
Hardway Cathey
Attorneys

Patented July 25, 1933

1,919,683

UNITED STATES PATENT OFFICE

HENRY C. BULLARD, OF HOUSTON, TEXAS

VEHICLE WHEEL

Application filed January 4, 1930. Serial No. 418,642.

This invention relates to new and useful improvements in a vehicle wheel, and has particular relation to a wheel for bicycles.

One object of the invention is to provide a wheel having a pneumatic tire thereon with interlocking means between the tire and the wheel rim to prevent the tire from creeping on the rim.

As at present constructed the tires of bicycles, in use, will creep around the rims with the result that the valves of the tires are pulled out of place causing the tires to leak.

It is the prime object of this invention to provide a novel type of tire and in combination therewith a novel type of rim of such construction that the tire will not creep around the rim.

Figure 1:
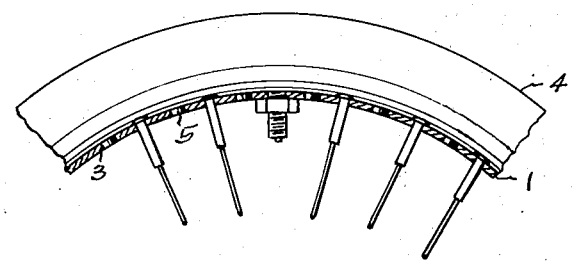
Figure 2:
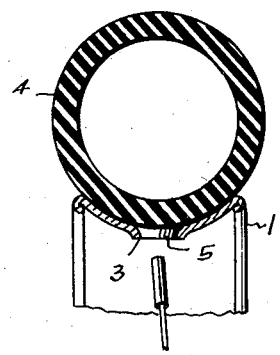

With the above and other objects in view the invention has particular relation to certain novel features of construction, arrangement of parts and use, examples of which are given in this specification and illustrated in the accompanying drawing, wherein:

Figure 1 shows a fragmentary side view, partly in section of the wheel, showing the rim in section and the tire thereon, and Figure 2 shows a fragmentary cross sectional view thereof.

Referring now more particularly to the drawing wherein like numerals of reference designate similar parts in each of the figures, the numeral 1 designates the rim of a bicycle wheel which has a row of perforations 3 therearound which are contracted inwardly toward the axes of the rim, the metal around each hole being deflected inwardly providing a wide, annular, inwardly tapering face stamped in the metal of the rim. The numeral 4 designates the tire and around the inner side of the tire there is a row of knobs or projections as 5 formed integrally with the material of the tire and arranged to correspond in position with the positions of the perforations 3 and which are shaped to conform to the contour of and to fit closely within said perforations and to wedge tightly against said faces and whose inner ends are approximately flush with the inside of the rim.

When the tire is mounted on a rim the knobs 5 will project through said perforations and the tire, when inflated, will thereby be held securely on the rim and can not creep therearound and injure the tire valve, when in use.

Means are thus provided for holding the tire against creeping without the use of cement for that purpose, although cement may be used as an additional security if desired.

The drawing and description disclose what is now considered to be a preferred form of the invention by way of illustration only, while the broad principle of the invention will be defined by the appended claim.

What I claim is:

The combination with a wheel having a thin, metal rim provided with holes spaced apart on a central line therearound, and which extend entirely through the rim and which are contracted inwardly toward the axis of the rim, the metal around each hole being deflected inwardly providing a wide, annular, inwardly tapering, face, a pneumatic tire on the rim having inside projections which are shaped to conform to the contour of and to fit closely within said holes and to wedge tightly against said face and whose inner ends are approximately flush with the inside of the rim.

HENRY C. BULLARD.